US005899317A

United States Patent [19]
Chisaki

[11] Patent Number: 5,899,317
[45] Date of Patent: May 4, 1999

[54] APPARATUS FOR PUSHING PULVERIZED AND/OR LUMPY OBJECTS

[75] Inventor: Tatsu Chisaki, Kawaguchi, Japan

[73] Assignee: Chisaki Co., Ltd., Tokyo, Japan

[21] Appl. No.: 08/783,801

[22] Filed: Jan. 15, 1997

[30] Foreign Application Priority Data

Jan. 26, 1996 [JP] Japan .................................... 8-031205

[51] Int. Cl.$^{6}$ ...................................................... B65G 25/00

[52] U.S. Cl. .................... 198/550.01; 198/747; 414/198; 110/289

[58] Field of Search .................................... 414/156, 176, 414/198; 198/550.01, 747; 110/289

[56] References Cited

U.S. PATENT DOCUMENTS

| | | | |
|---|---|---|---|
| 1,215,529 | 2/1917 | Henry | 110/289 |
| 1,782,955 | 11/1930 | Biggert, Jr. | 414/198 |
| 2,005,005 | 6/1935 | Preston | 110/289 |
| 2,005,006 | 6/1935 | Preston | 110/289 |
| 3,127,035 | 3/1964 | Bourel | 414/198 |
| 3,472,502 | 10/1969 | Schott | 414/198 |
| 4,944,383 | 7/1990 | Petrachkoff | 414/156 |
| 5,394,806 | 3/1995 | Cole et al. | 110/289 |

*Primary Examiner*—David A. Bucci
*Assistant Examiner*—Douglas Hess
*Attorney, Agent, or Firm*—Evenson, McKeown, Edwards & Lenahan, P.L.L. C.

[57] ABSTRACT

An apparatus for pushing in a predetermined quantity solid pulverized and/or lumpy objects forming a deposited layer to a discharge section includes: a plurality of pusher members disposed in parallel with each other; and a driving device to which the plurality of pusher members are connected so as to push the pulverized and/or lumpy objects to the discharge section as the plurality of pusher members are reciprocated by the driving device in a longitudinal direction of each of the plurality of pusher members, the driving device having a first axially supporting portion and a second axially supporting portion which are arranged at two positions in the longitudinal direction such that the driving device is angularly displaceable about an axis of the first axially supporting portion and an axis of the second axially supporting portion, the axis of the first axially supporting portion and the axis of the second axially supporting portion being in a perpendicular relationship to each other when projected on a plane perpendicular to the longitudinal direction.

16 Claims, 6 Drawing Sheets

APPARATUS FOR PUSHING PULVERIZED AND/OR LUMPY OBJECTS

BACKGROUND OF THE INVENTION

1. Field of the Invention

The present invention relates to a technical field in which solid pulverized and/or lumpy objects formed in a deposited layer are pushed and moved in predetermined quantities, and more particularly to an apparatus for pushing such pulverized and/or lumpy objects.

2. Description of the Related Art

This type of apparatus is used extensively in a field in which solid pulverized and/or lumpy objects are handled, and is also used in, among others, a heating furnace apparatus such as the one shown in the appended drawing, FIG. 6.

In FIG. 6, a substantially horizontal hearth 51 having the shape of an annular plate is rotatively driven around a vertical axis 52. An outer cylinder 53 and an inner cylinder 54 which constitute parts of a furnace body are disposed above the hearth 51, and the inner cylinder 54 is connected to a furnace cover 55. An annular space 56 is formed by the hearth 51, the outer cylinder 53, and the inner cylinder 54. The pulverized and/or lumpy objects to be calcinated are supplied from the outside into the annular space 56 through supply pipes 58 provided in such a manner as to penetrate an upper wall 57 for connecting the outer cylinder 53 and the inner cylinder 54, and are stored therein, thereby forming a deposited layer 59 in the annular space 56.

A burner 60 and an air supply pipe 61 are provided through the furnace cover 55, and the deposited layer 59 is subjected to preheating on a combustion space 62 side by means of heat from combustion gases in the combustion space 62.

Rod-like pushers 63 extending toward the center are provided through the outer cylinder 53 at a plurality of circumferential positions. Each of the pushers 63 is coupled to a rod of a cylinder unit 64 provided on the outer side, and is reciprocated in the longitudinal direction of the pusher 63 while being guided by a guide portion 53A of the outer cylinder 53, and pushes the preheated pulverized and/or lumpy objects toward a drop port 51A in the hearth 51 on each occasion of its reciprocating motion. The dropped pulverized and/or lumpy objects form a deposited layer again in a vertical furnace 65 and are allowed to mature in an upper portion of the deposited layer, are then allowed to drop to a lower portion of the vertical furnace 65 while being cooled by air which is supplied from the lower portion of the vertical furnace 65 and rises through the deposited layer, and are taken out as products. The air which has undergone a temperature rise and has assumed a high temperature, after having cooled the pulverized and/or lumpy objects matured in the vertical furnace 65 and having risen through the deposited layer, contributes to the combustion in the combustion chamber 62. The exhaust gases after combustion are passed through the deposited layer 59 on the hearth 51, and are discharged from exhaust pipes 66.

With the above-described apparatus shown in FIG. 6, the pushers 62 provided at a plurality of circumferential positions above the hearth 51 are generally reciprocated with their operating timings staggered, and cause the pulverized and/or lumpy objects to drop in predetermined quantities uniformly in the circumferential direction in conjunction with the rotation of the hearth 51. As for the above-described pushers, there are cases where a single pusher or a set of two pushers are provided at each of the circumferential positions. In the case of the single pusher, since a forward end of the rod of the cylinder unit is coupled to a rear end of the pusher, the overall length becomes very long, so that, in many cases, pushers are respectively disposed on both sides of the cylinder unit and the two pushers are used as a set. In either case, the cylinder units are fixedly disposed outside the heating furnace apparatus, the positions and attitudes of the pushers 63 which are guided by the guide portions 53A in the outer cylinder 53, as well as the rods of the cylinder devices 64, are naturally determined, and therefore cannot be adjusted.

However, the pushers are elongated, so that fabrication errors, deformation during the operation, their inclination due to clearances in the guide portions, and so on are liable to occur. Consequently, the sliding in the guide portions can cease to be smooth, and excessively large loads may be applied to the rods of the cylinder units. In the case where two pushers are made as one set, a load is applied to the rod in such a manner as to bend the rod unless the loads on the respective pushers are equal. Such excessively large loads on the rods become particularly noticeable since thermal deformation occurs when the pushers are subjected to heating as in the heating furnace apparatus, so that a countermeasure thereon has been called for.

SUMMARY OF THE INVENTION

Therefore, it is an object of the present invention to provide an apparatus for pushing pulverized and/or lumpy objects which makes it possible to allow the rods to operate smoothly even if there are errors in the fabrication of the pushers and deformation during use.

To this end, in accordance with the present invention, there is provided an apparatus for pushing, in a predetermined quantity, of solid pulverized and/or lumpy objects forming a deposited layer to a discharge section, comprising: a plurality of pusher members disposed in parallel with each other; and a driving device to which the plurality of pusher members are connected so as to push the pulverized and/or lumpy objects to the discharge section as the plurality of pusher members are reciprocated by the driving device in a longitudinal direction of each of the plurality of pusher members, the driving device having a first axially supporting portion and a second axially supporting portion which are arranged at two positions in the longitudinal direction such that the driving device is angularly displaceable about an axis of the first axially supporting portion and an axis of the second axially supporting portion, the axis of the first axially supporting portion and the axis of the second axially supporting portion being in a perpendicular relationship to each other when projected on a plane perpendicular to the longitudinal direction.

In accordance with the pushing apparatus in accordance with the present invention which is arranged as described above, even if inclination occurs due to fabrication errors of the pusher members and deformation during the operation, since the driving device is angularly displaceable at the first and second axially supporting portions which are in a perpendicular relationship to each other, the pusher members operate smoothly without being affected by their inclination in any direction.

The driving device may have a cylinder unit and a coupler for coupling a rod of the cylinder unit to each of the pusher members to allow the rod of the cylinder unit to be retained by each of the pusher members in the longitudinal direction.

As for the specific arrangement of the aforementioned coupler and rod, an arrangement may be provided such that each of the plurality of pusher members is provided with a peripheral groove on an outer surface thereof, and the coupler has a coupling member coupled to the rod of the cylinder unit and permitting each of the pusher members to be passed therethrough and split members which are split for each of the pusher members at a plurality of circumferential positions thereof and can be fitted to the groove, the split members being capable of being secured to the coupling member. Since such split members are adopted, the pusher member can be easily removed independently of the cylinder unit, and can be reassembled.

In addition, in a case where the aforementioned coupler is provided, the first axially supporting portion may be provided in a supporting portion for supporting a cylinder body of the cylinder unit, while the second axially supporting portion may be provided in a coupling portion for coupling the rod and the coupler.

Each of the pusher members may be guided reciprocatably in the longitudinal direction by a first guide portion provided in a wall portion for partitioning a storage chamber where the deposited layer of the pulverized and/or lumpy objects is formed and an outer space and by a second guide portion provided exteriorly of the wall portion. At that time, the first guide portion may have a sliding portion for slidably supporting the pusher member and a seal portion for slidably sealing the pusher member, and a gland packing may be accommodated in the seal portion in such a manner that the gland packing can be replaced from the outside, while the second guide portion may have roller members which are rotatable in conjunction with the reciprocating motion of the pusher member.

It should be noted that a cylinder unit, an electrically operated threaded shaft device, a rack-and-pinion device, or the like can be used as the driving device in the present invention, and at that time a pneumatic type, a hydraulic type using water or oil pressure, or the like may be used as the cylinder unit.

In accordance with the present invention, as described above, the arrangement provided is such that a plurality of pusher members are disposed in parallel with each other, and the plurality of pusher members are connected to the driving device having a first axially supporting portion and a second axially supporting portion which are arranged at two positions in the longitudinal direction such that the driving device is angularly displaceable about an axis of the first axially supporting portion and an axis of the second axially supporting portion, the axis of the first axially supporting portion and the axis of the second axially supporting portion being in a perpendicular relationship to each other when projected on a plane perpendicular to the longitudinal direction. Accordingly, it is possible to obtain advantages in that production errors of the pusher members, the offset load between two pusher members, and the inclination of the pusher members based on the thermal deformation and the like of the pusher members can be absorbed at the first axially supporting portion and the second axially supporting portion, and that the driving device is not subjected to an excessively large load due to the aforementioned inclination, and smooth operation is ensured at all times.

The above and other objects, features and advantages of the present invention will become more apparent from the following detailed description of the invention when read in conjunction with the accompanying drawings.

DESCRIPTION OF THE PREFERRED EMBODIMENT

Referring now to FIGS. 1 to 5 of the appended drawings, a description will be given of an embodiment of the present invention.

Figure 1:
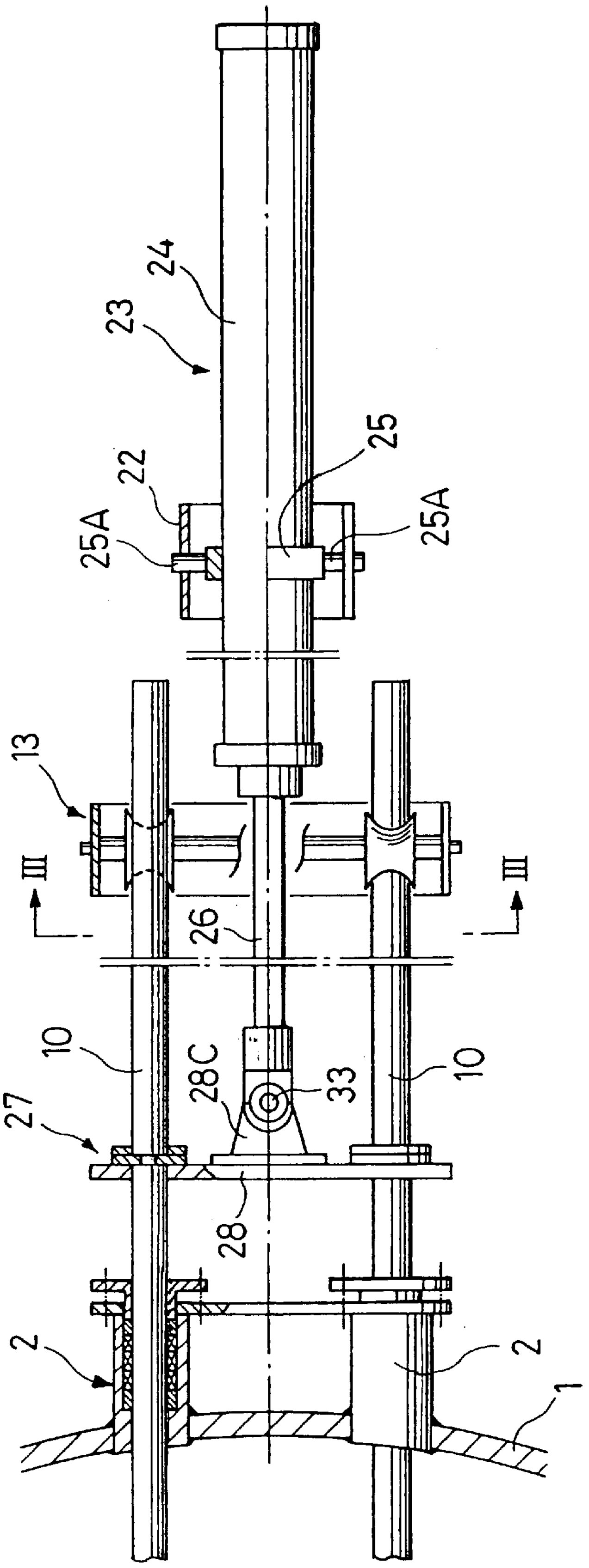
FIG. 1 is a partly fragmentary plan view illustrating an embodiment of the present invention.
Figure 2:
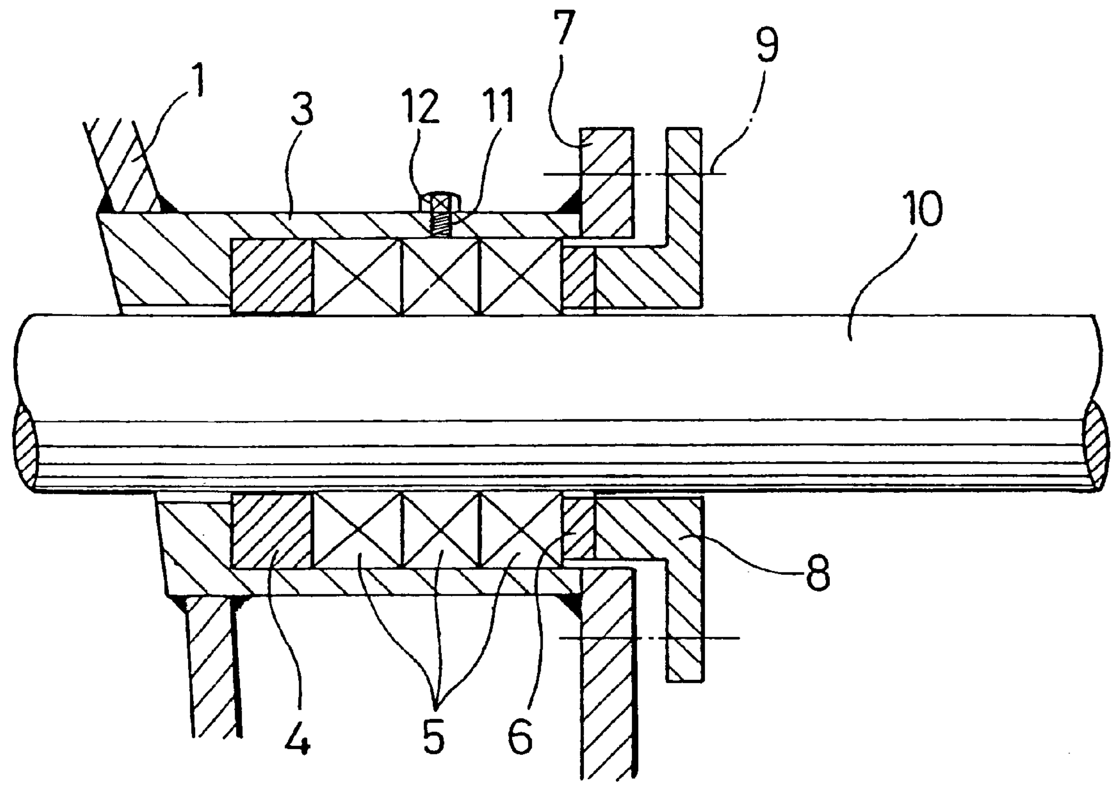
FIG. 2 is an enlarged horizontally cross-sectional view illustrating a first guide portion of the apparatus shown in FIG. 1.
Figure 3:
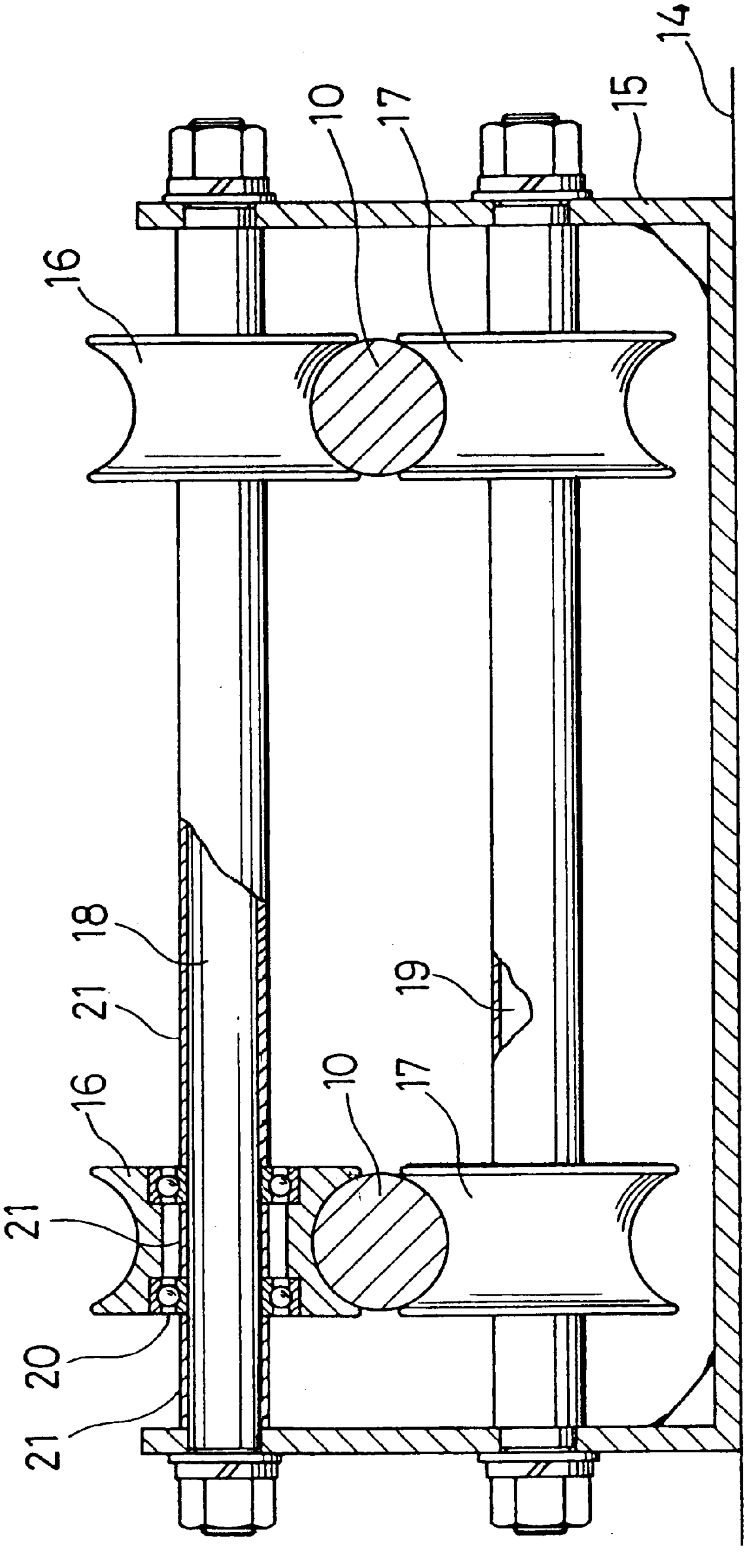
FIG. 3 is a cross-sectional view, taken along III—III in FIG. 1, only with respect to a second guide portion.

FIG. 1 is a plan view of the apparatus in accordance with an embodiment of the present invention. In the drawing, reference numeral 1 denotes a portion of a wall portion of a hollow cylindrical vertical furnace body, which corresponds to an outer casing 53 in FIG. 6. Two first guide portions 2 are provided in parallel as a set in each of a plurality of circumferential positions in the wall portion 1. As shown in FIG. 2, each of the first guide portions 2 is arranged such that a guide ring 4 serving as a sliding portion, a gland packing 5 forming a seal portion, and a push ring 6 are accommodated in a hollow cylindrical member 3 which is secured to the wall portion 1 of the furnace and extends in an outward direction, and a tightening ring 8 is attached by means of screws 9 to a flange 7 which is secured to the hollow cylindrical member 3. In the above-described first guide portion 2, a round rod-shaped pusher member 10 is guided and supported by the guide ring 4 in such a manner as to be slidable in its longitudinal direction, and a seal is provided between the pusher member 10 and the hollow cylindrical member 3 by means of the gland packing 5 which is helically wound around the pusher member 10. The gland packing 5 is brought into sliding contact with the pusher member 10 with an appropriate contact pressure by the adjustment of the degree of tightening of the tightening ring 8 by the screws 9. In addition, if the tightening ring 8 is removed, it becomes possible to replace the gland packing 5. Incidentally, a lubricant port 11 is formed in the hollow cylindrical member 3 as a threaded hole, and a plug 12 is screwed into it. A lubricating oil is lubricated through the lubricant port 11 at appropriate timings, and permeates the gland packing 5, so as to maintain its sliding contact with the pusher member 10 in a smooth condition.

A forward end of the above-described pusher member 10 is passed through the wall portion 1 and extends to the interior of the furnace body, while a rear end thereof extends outside the furnace and is guided by a second guide portion 13. As shown in FIG. 1 and particularly in FIG. 3 which shows a cross section, taken along III—III in FIG. 1, only with respect to the second guide portion 13, the second guide portion 13 has a pair of upper rollers 16 and a pair of lower rollers 17 which are rotatably provided on a supporting frame 15 secured to a base 14. The pusher member 10 is guided and supported in such a manner as to be nipped by round grooves of the upper roller 16 and the lower roller 17. The upper rollers 16 and the lower rollers 17 are respectively provided rotatably on an upper shaft 18 and a lower shaft 19 attached to opposite side portions of the supporting frame 15, by means of bearings 20. Incidentally, spacer sleeves 21 are fitted over the upper shaft 18 and the lower shaft 19 so as to hold the upper rollers 16 and the lower rollers 17 at predetermined positions in the axial direction.

Another supporting frame 22, which is shown in FIG. 1, is secured to the base 14, and supports a cylinder body 24 of a cylinder unit 23 serving as a driving device. A frame-like supporting portion 25 is mounted on the cylinder body 24, and a shaft-like arm 25A extending in the radial direction of the cylinder body 24 is provided in the supporting portion 25 as a first axially supporting portion. Then, the arm 25A is rotatably supported by the supporting frame 22. As such, the cylinder body 24 forms a so-called trunnion structure by means of the first axially supporting portion having the arm 25A, and is therefore rotatable about the arm 25A.

Figure 4:
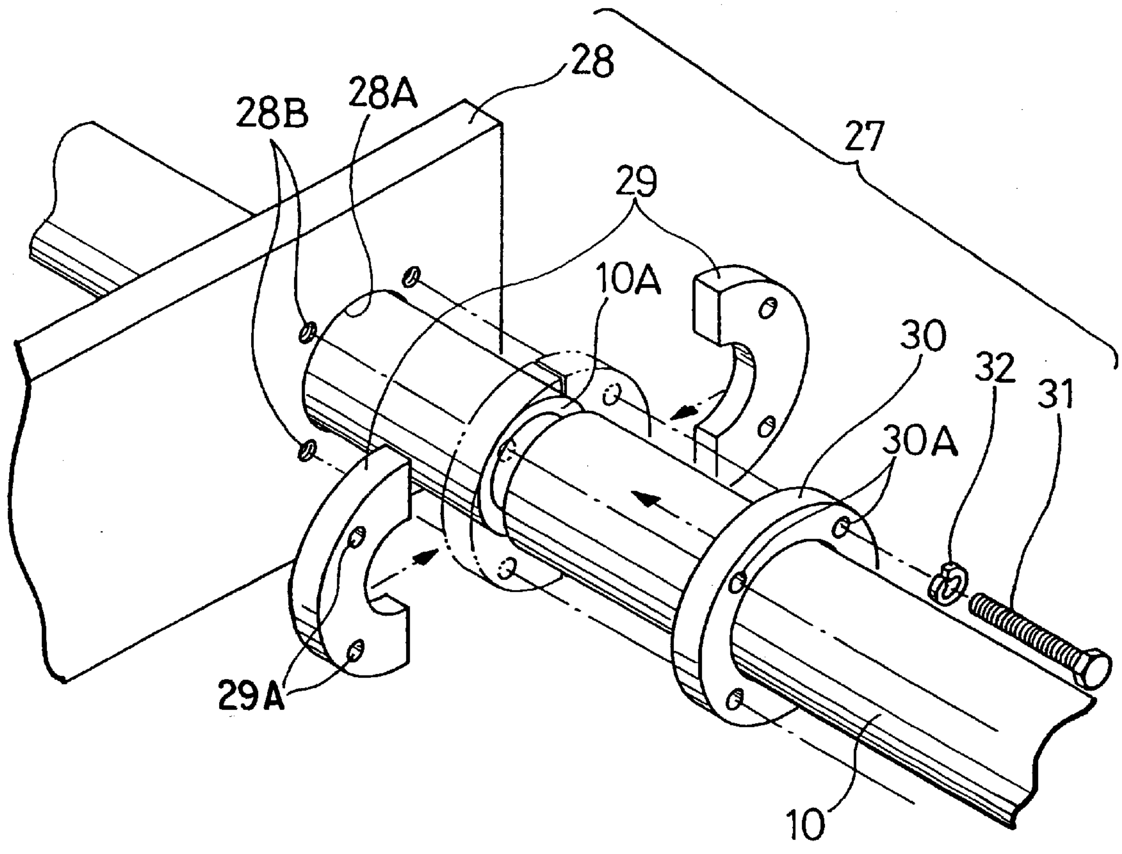
FIG. 4 is an exploded perspective view of an essential portion of a coupler of the apparatus shown in FIG. 1.

The aforementioned two pusher members 10 are coupled to a rod 26 of the cylinder unit 23 by means of a coupler 27. As shown in FIGS. 1 and 4, the coupler 27 is mainly provided with a plate-like coupling member 28, split members 29 formed by splitting an annular plate into two, a fixing ring 30, bolts 31, and the like. The coupling member 28 has a length for bridging the two pusher members 10 which form a set, and the coupling member 28 is provided with two holes 28A through which the pusher members 10 can be passed at the positions of the two pusher members 10, threaded holes 28B for threaded engagement with the bolts 31 being formed at a plurality of positions around each of the holes 28A. The split members 29 have a form in which a ring is split into a plurality of parts (into two in this example), are fitted to a peripheral groove 10A formed on the pusher member 10 from both sides (see the two-dotted dash lines in FIG. 4), and are retained at the peripheral groove 10A in the longitudinal direction of the pusher member 10. The split members 29 are provided with holes 29A through which the bolts 31 are passed at positions corresponding to the threaded holes 28B. The fixing ring 30 is fitted over the pusher member 10. The fixing ring 30 is provide with holes 30A through which the bolts 31 are passed at positions corresponding to the holes 29A in the split members. Incidentally, reference numeral 32 denotes a washer for the bolt 31. As such, as each bolt 31 is passed through the hole 30A in the fixing ring and the hole 29A in the split member 29, and is then threadedly engaged in the threaded hole 28B in the coupling member 28 and is tightened, the split members are retained on the pusher member 10 in the longitudinal direction.

As shown in FIG. 1, a projecting portion 28C is provided at a central portion of the aforementioned coupling member 28 in such a manner as to project in the rearward direction. Here, the forward end of the rod 26 of the cylinder unit 23 is rotatably coupled to the projecting portion 28C by means of a pin 33, thereby forming a second axially supporting portion. The pin 33 extends in a direction perpendicular to the plane of the drawing of FIG. 1, and when it is projected in the longitudinal direction of the rod, the pin 33 is in a perpendicular relationship to the arm 25A of the aforementioned first axially supporting portion.

In the apparatus having the above-described arrangement, when the cylinder unit 23 is operated and its rod 26 reciprocates back and forth, the coupling member 27, which is coupled to the rod 26 by means of the pin 33 at the second axially supporting portion, also undergoes a reciprocating motion in conjunction with the same. Consequently, as the split members 29 of the coupling member 27 are retained in the peripheral grooves 10A of the pusher members 10, the coupling member 27 thus reciprocates the pusher members 10 back and forth. When the pusher members 10 advance forward, their forward ends cause the pulverized and/or lumpy objects deposited interiorly of the wall portion 1 to be moved to a discharge section such as a drop port in a predetermined quantity.

In general, the pusher members 10 are relatively long as compared to their diameters, so that fabrication errors are liable to occur with respect to the linearity in the longitudinal direction. In addition, in a case where a load is applied in such a manner as to be offset toward one of the two pusher members, inclination of the pusher members 10 appears. Further, in the heating furance apparatus, the pusher members 10 are subjected to heat from the pulverized and/or lumpy objects which are at high temperature during the operation, and are therefore liable to undergo bending due to thermal expansion. In such cases, however, since the first axially supporting portion (arm 25A) and the second axially supporting portion (pin 33), which are in a perpendicular relation to each other and are angularly displaceable about their axes, are provided, inclination in various directions can be absorbed here, with the result that the effect due to the inclination of the pusher members 10 is not brought to the cylinder unit 23. Accordingly, an excess load due to the aforementioned inclination is not applied to the rod 26 of the cylinder unit 23, thereby ensuring smooth operation.

In a case where the pusher member 10 is to be drawn out from the wall portion 1 for the purpose of maintenance or the like, simply by pulling out the bolts 31 and removing the split members 29 sideways, only the pusher member 10 can be drawn out independently of the cylinder unit 23.

Although two pusher members are formed as one set in the illustrated example, the present invention is not limited to the same, and three or more pusher members may of course be formed as a set. In addition, although, as for the coupling member, the split ring is held by the fixing ring, the split ring may be directly secured to the coupling member by bolts without using the fixing ring.

Figure 5:
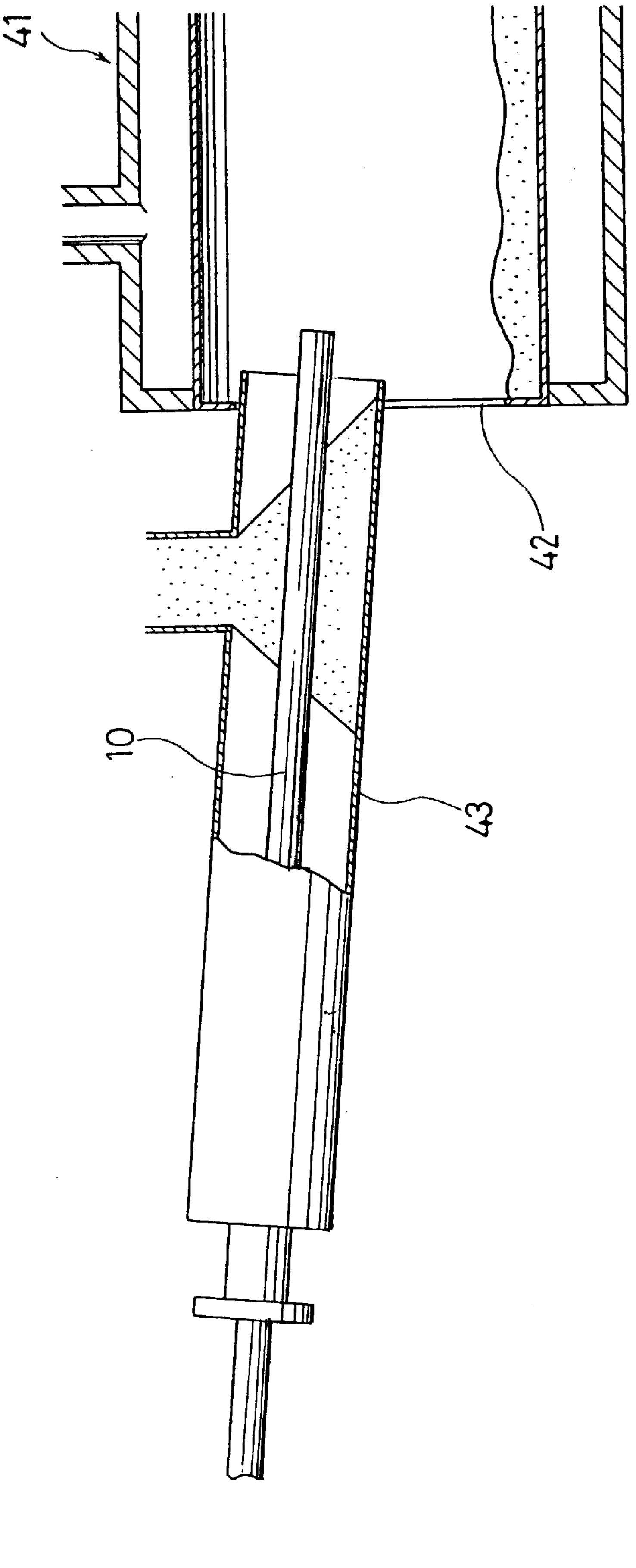
FIG. 5 is a partly fragmentary front elevational view illustrating an example of a heating furnace apparatus to which the apparatus shown in FIG. 1 is applicable.
Figure 6:
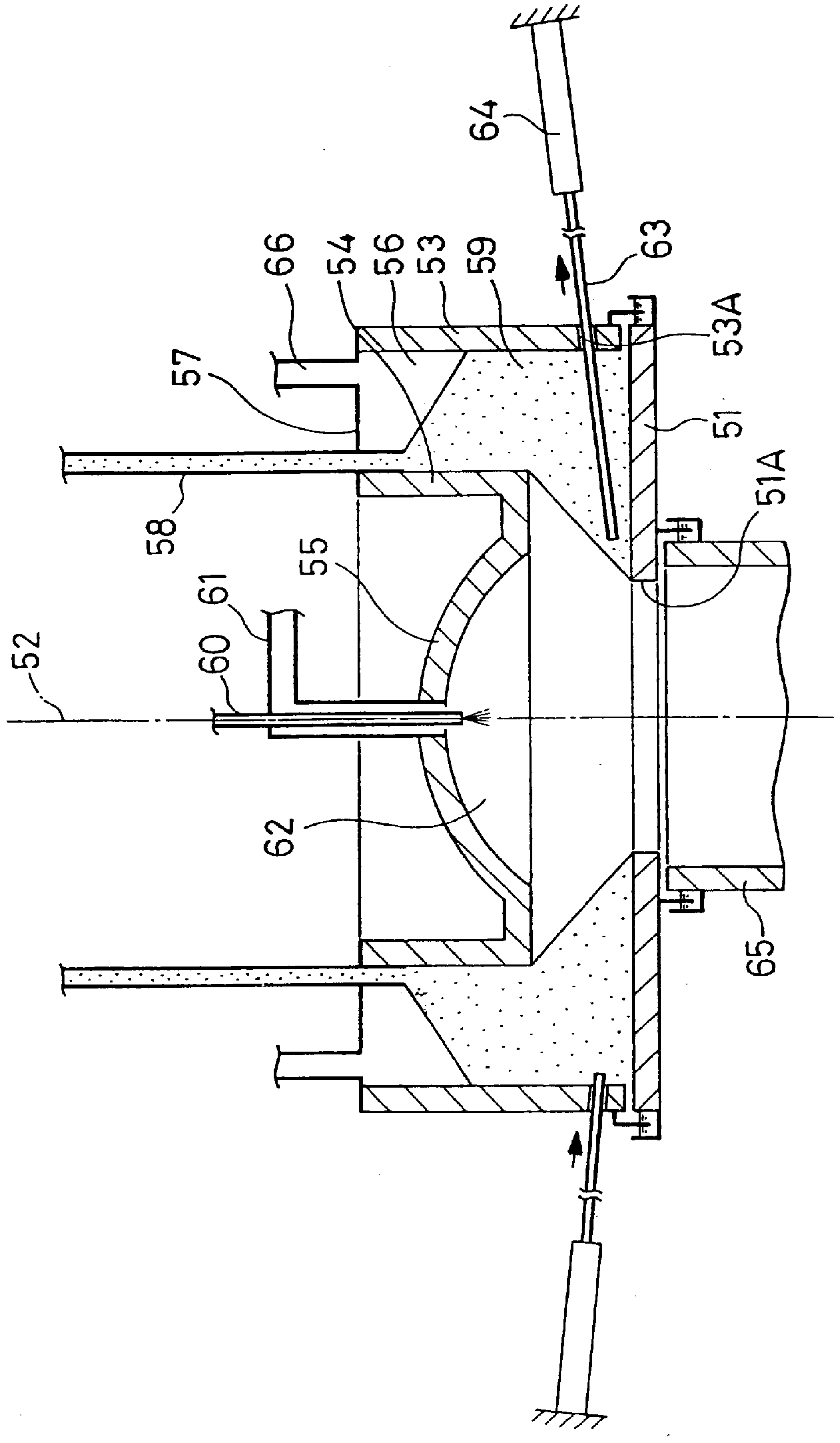
FIG. 6 is a vertical cross-sectional view of a heating furnace apparatus having a conventional pushing apparatus.

In addition, the apparatus of the above-described arrangement is also applicable to a horizontal heating furnace such as the one shown in FIG. 5, in addition to the vertical heating furnace apparatus such as the one shown in FIG. 6 as a conventional example. In this case, the pusher members 10 are disposed in a hollow cylindrical storage section 43 facing a supply port 42 of a furnace body 41 of the horizontal type. The pulverized and/or lumpy objects which are supplied from the outside and form a deposited layer with an angle of repose inside the storage section 43 are pushed forward by the pusher members 10, and are thereby allowed to slide down into the furnace body 41 in a predetermined quantity. The pusher members 10 are supported in the form shown in FIG. 1 referred to above, and are driven.

The present invention is applicable to, in addition to the heating furnace apparatus, an apparatus having pusher members for causing pulverized and/or lumpy objects forming a deposited layer to be moved to a predetermined position, e.g., a pushing apparatus for a coke oven, as required.

What is claimed is:

1. An apparatus for pushing solid pulverized and/or lumpy objects forming a deposited layer to a discharge section, comprising:

- a plurality of pusher members disposed in parallel with each other; and
- a driving device to which said plurality of pusher members are connected so as to push the pulverized and/or lumpy objects to the discharge section as said plurality of pusher members are reciprocated by said driving device in a longitudinal direction of each of said plurality of pusher members, said driving device having a first axially supporting portion and a second axially supporting portion which are arranged at two positions in the longitudinal direction such that said driving device is angularly displaceable about an axis of said first axially supporting portion and an axis of said second axially supporting portion, the axis of said first axially supporting portion and the axis of said second axially supporting portion being in a perpendicular relationship to each other when projected on a plane perpendicular to the longitudinal direction.

2. An apparatus for pushing pulverized and/or lumpy objects according to claim 1, wherein said driving device has a cylinder unit and a coupler for coupling a rod of said cylinder unit to each of said pusher members to allow the rod of said cylinder unit to be retained by each of said pusher members in the longitudinal direction.

3. An apparatus for pushing pulverized and/or lumpy objects according to claim 2, wherein each of said plurality of pusher members is provided with a peripheral groove on an outer surface thereof, and said coupler has a coupling member coupled to the rod of said cylinder unit and permitting each of said pusher members to be passed therethrough, and said coupler has split members for each of said pusher members, said split members being split at a plurality of circumferential positions thereof, said split members being capable of being fitted to the groove, said split members being capable of being secured to said coupling member.

4. An apparatus for pushing pulverized and/or lumpy objects according to claim 1, wherein said driving device is provided with a cylinder unit and a coupler for coupling a rod of said cylinder unit to each of said pusher members to allow the rod of said cylinder unit to be retained by each of said pusher members in the longitudinal direction, and wherein said first axially supporting portion is provided in a supporting portion for supporting a cylinder body of said cylinder unit, while said second axially supporting portion is provided in a coupling portion for coupling the rod and said coupler.

5. An apparatus for pushing pulverized and/or lumpy objects according to any one of claims 1 to 4, wherein each of said pusher members is guided reciprocatably in the longitudinal direction by a first guide portion provided in a wall portion for partitioning a storage chamber where the deposited layer of the pulverized and/or lumpy objects is formed and an outer spaces and by a second guide portion provided exteriorly of the wall portion.

6. An apparatus for pushing pulverized and/or lumpy objects according to claim 1, wherein each of said pusher members is guided via a first guide portion and a second guide portion, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

7. An apparatus for pushing pulverized and/or lumpy objects according to claim 2, wherein each of said pusher members is guided reciprocatably in the longitudinal direction by a first guide portion provided in a wall portion for partitioning a storage chamber where the deposited layer of the pulverized and/or lumpy objects is formed and an outer space, and by a second guide portion provided exteriorly of the wall portion.

8. An apparatus for pushing pulverized and/or lumpy objects according to claim 3, wherein each of said pusher members is guided reciprocatably in the longitudinal direction by a first guide portion provided in a wall portion for partitioning a storage chamber where the deposited layer of the pulverized and/or lumpy objects is formed and an outer space, and by a second guide portion provided exteriorly of the wall portion.

9. An apparatus for pushing pulverized and/or lumpy objects according to claim 4, wherein each of said pusher members is guided reciprocatably in the longitudinal direction by a first guide portion provided in a wall portion for partitioning a storage chamber where the deposited layer of the pulverized and/or lumpy objects is formed and an outer space, and by a second guide portion provided exteriorly of the wall portion.

10. An apparatus for pushing pulverized and/or lumpy objects according to claim 2, wherein each of said pusher members is guided via a first guide portion and a second guide portion, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

11. An apparatus for pushing pulverized and/or lumpy objects according to claim 3, wherein each of said pusher members is guided via a first guide portion and a second guide portion, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

12. An apparatus for pushing pulverized and/or lumpy objects according to claim 4, wherein each of said pusher members is guided via a first guide portion and a second guide portion, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

13. An apparatus for pushing pulverized and/or lumpy objects according to claim 5, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

14. An apparatus for pushing pulverized and/or lumpy objects according to claim 7, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

15. An apparatus for pushing pulverized and/or lumpy objects according to claim 8, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

16. An apparatus for pushing pulverized and/or lumpy objects according to claim 9, wherein said first guide portion has a sliding portion for slidably supporting a respective one of said pusher members and a seal portion for slidably sealing said respective one of said pusher members, a gland packing being accommodated in said seal portion in such a manner that said gland packing can be replaced from the outside, while said second guide portion has roller members which are rotatable in conjunction with the reciprocating motion of said pusher members.

* * * * *